(12) United States Patent
Pease

(10) Patent No.: US 6,176,036 B1
(45) Date of Patent: Jan. 23, 2001

(54) TERMINAL TACKLE

(76) Inventor: Philp J. Pease, 23803 Spring Moss, Spring, TX (US) 77373

( * ) Notice: Under 35 U.S.C. 154(b), the term of this patent shall be extended for 0 days.

(21) Appl. No.: 09/361,106

(22) Filed: Jul. 26, 1999

Related U.S. Application Data

(60) Provisional application No. 60/094,025, filed on Jul. 27, 1998.

(51) Int. Cl.[7] .................... A01K 91/047; A01K 91/053
(52) U.S. Cl. .................... 43/44.9; 43/43.1; 43/42.74; 43/42.53
(58) Field of Search .................. 43/43.1, 44.83, 43/44.84, 44.85, 42.49, 44.9, 42.53, 42.74; 24/908

(56) References Cited

U.S. PATENT DOCUMENTS

| | | | | |
|---|---|---|---|---|
| 86,786 | * | 2/1869 | Tellgmann | 43/44.9 |
| 289,612 | * | 12/1883 | Bollermann | 43/44.84 |
| 1,766,532 | * | 6/1930 | Pflueger | 43/43.1 |
| 2,731,758 | * | 1/1956 | Coe | 43/43.1 |
| 2,770,908 | * | 11/1956 | Hessert | 43/42.74 |
| 2,877,593 | * | 3/1959 | Baldridge | 43/42.74 |
| 3,550,305 | * | 12/1970 | Santosuosso | 43/42.74 |
| 3,805,438 | * | 4/1974 | McLaughlin | 43/42.74 |
| 3,905,144 | * | 9/1975 | Shaw | 43/42.74 |

* cited by examiner

Primary Examiner—Kurt Rowan
(74) Attorney, Agent, or Firm—Jo Katherine D'Ambrosio

(57) ABSTRACT

A terminal tackle for minimizing the twisting of fishing lines, lures and weights, particularly the twisting and tangling of a weight or weight line with lure leader line or the primary fishing line. The terminal tackle comprises a y-shaped tube having a top arm and one abbreviated arm. A line swivel is positioned within the top arm for connecting fishing tackle such as weights and lures, to the primary fishing line. A lure leader swivel having a leader end and a connector end is threaded through the y-shaped tube so that the leader end extends out and away from the abbreviated arm and the connector end is positioned within the y-shaped tube. A weight connector is positioned within the elongated arm and is adapted to connect weight to the fishing tackle and a connector or snap for connecting the leader swivel the line swivel and the weight connector is positioned within the y-shaped tube.

12 Claims, 3 Drawing Sheets

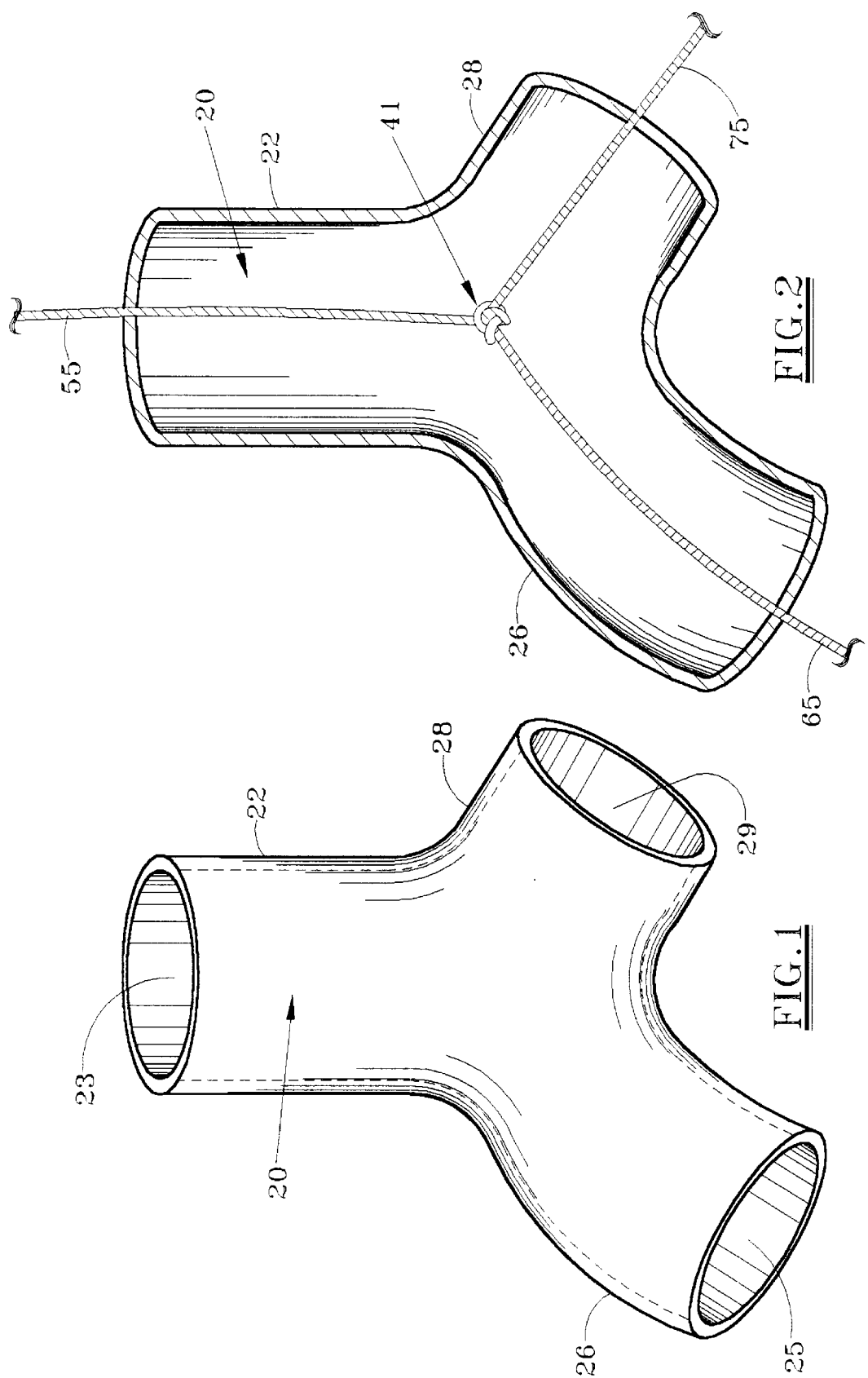

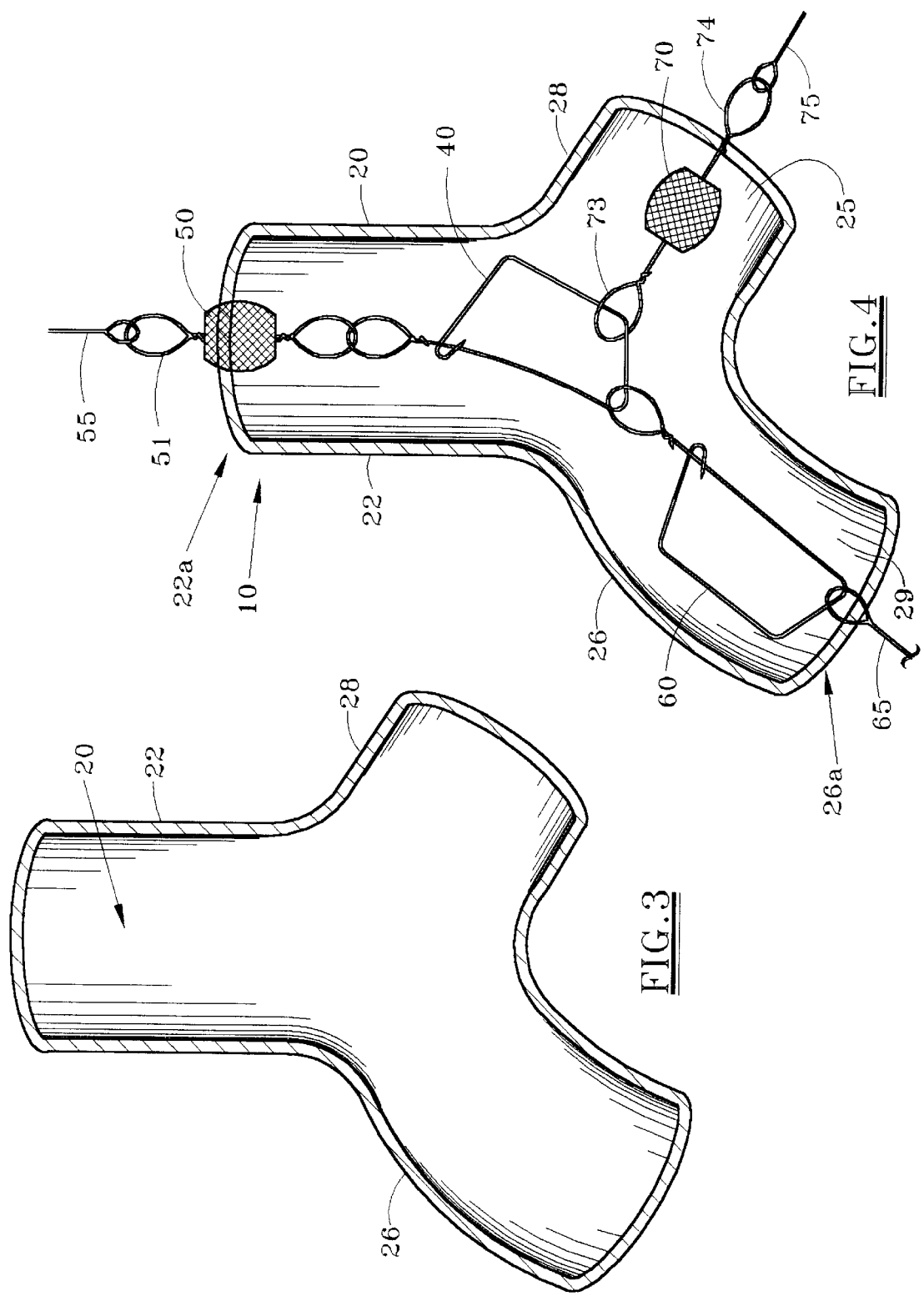

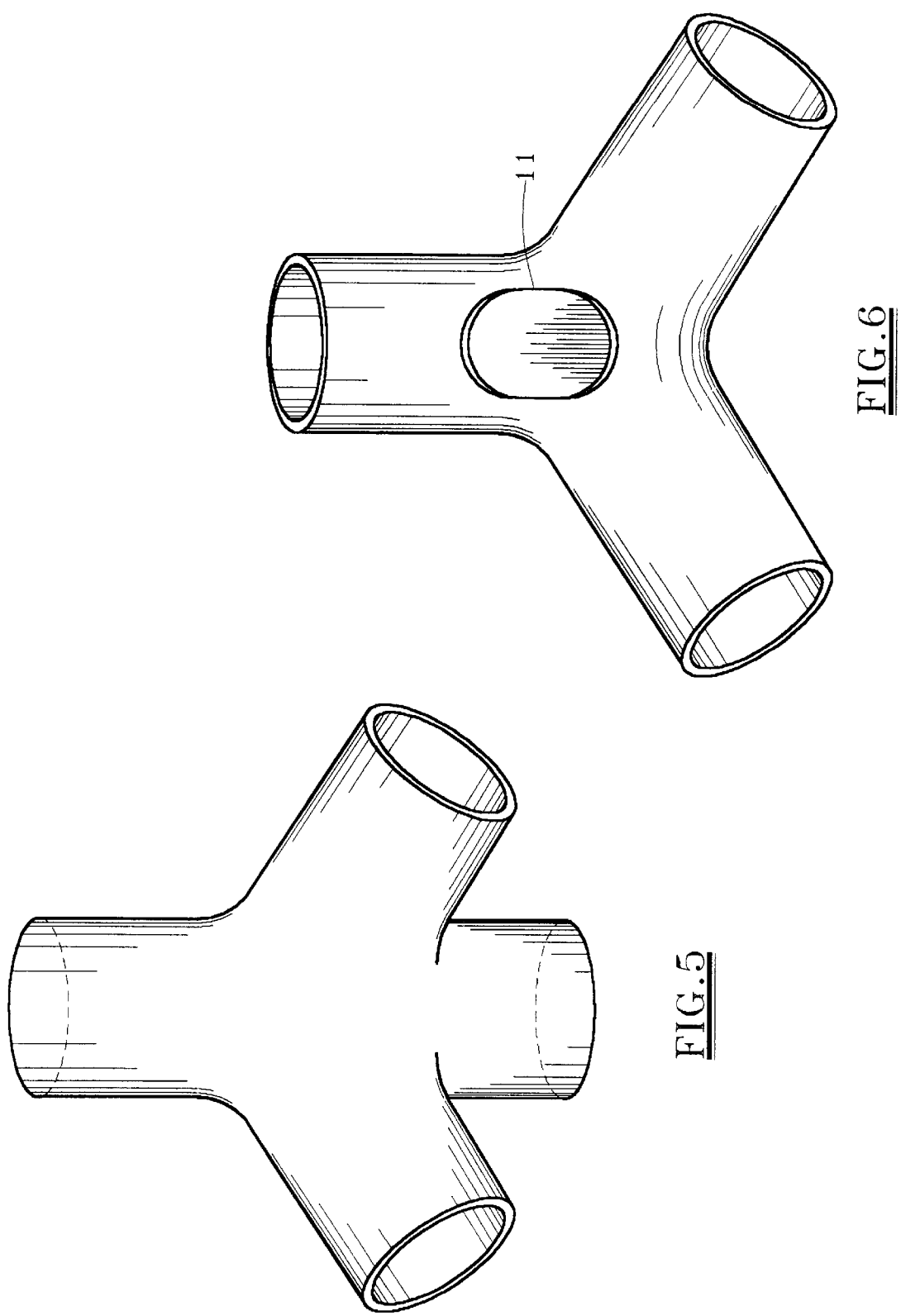

TERMINAL TACKLE

This application is the regular application under 35 USC § 111(a) of provisional application No. 60/094,025 date, Jul. 27, 1998.

FIELD OF THE INVENTION

The present invention relates to terminal tackle for minimizing the twisting of fishing line, lures and weights, particularly the twisting and tangling of a weight or weight line with a lure leader line or the primary fishing line.

BACKGROUND OF THE INVENTION

Fishing tackle often comprises one primary fishing line connected to a rod and reel and other, shorter lines to connect lures or weights to the primary fishing line. Lure leader lines are used to connect the lures to the primary fishing lines. The lure leader line and lure or bait typically float and are subject to the currents and movements of the water thereby simulating natural bait for fish. Weights are added by means of weight lines to control the water depth at which the lure will float. The depth and movement of the lure is important to its effectiveness in attracting fish.

One annoying problem for fishermen is the twisting of weights around a fishing line or the leader line. While casting or trolling, the lure leader line or lure can become twisted and tangled with the fishing line or with the weight line. The weight line or weights can also twist and tangle with the primary fishing line as the line is cast, when trolling or when settled at the bottom. Often the weight can become twisted around the lure leader line. When this happens, the lure or bait does not look natural to fish and the effectiveness of the lure in attracting fish is greatly diminished.

Line swivels and snap swivels tend to reduce twisting and tangling of fishing lines. Harms, in U.S. Pat. No. 3,971,153 discloses a device for use with fishing tackle. The '153 device is used for removing twist from a fishing line. The device comprises a body having a connector for connecting the body to the end of the fishing line with the body having rib means or fin means thereon which cause it to rotate when it is drawn through the water. U.S. Pat. No. 5,113,608 to Hook teaches a fishing line connecting system for removing and changing lures and weights.

What is needed is terminal tackle that minimizes or prevents the primary leader line, weight and weight lines and lure and lure leader lines of the fishing tackle from twisting and tangling with each other. Less tangling of lines can lead to better catching.

SUMMARY OF THE INVENTION

To effectively fish utilizing a single fishing lure or multiple lures, it is necessary to minimize the occurrence of twisting or tangling of the fishing lines, lures or weights. The present invention is a terminal tackle and method of manufacture. One goal of the present invention is to minimize the twisting or tangling of fishing line with multiple lures and weights and attached ancillary lines. It is another goal of the invention to facilitate the use of multiple lures and lure leader lines by maintaining a desired distance between the lures.

In one preferred embodiment, the terminal tackle comprises a hollow tube with one or more arms enclosing the connection of the primary fishing line, a lure leader line and/or a weight line. A connector within the tube is adapted for connecting the primary fishing line, a lure leader line and/or a weight line. One preferred embodiment of the terminal tackle comprises a tube having one top arm, one elongated arm and one abbreviated arm. Preferably, a weight-connecting means is positioned within the elongated arm. The weight connecting means is adapted to connect a weight (not shown) to fishing tackle. A connector positioned within the tube connects a line swivel, a lure leader swivel and the weight-connecting means.

One preferred terminal tackle for minimizing the twisting or tangling of fishing lines can comprise a y-shaped tube having a straight top arm, one curved, elongated arm and one curved, abbreviated arm. The terminal tackle preferably has a line swivel positioned within the top arm. The line swivel is adapted to connect the terminal tackle to the primary fishing line. Preferably a lure leader swivel, having a leader end adapted to connecting with the lure leader line and a connector end, is positioned within the y-shaped tube. Preferably, the lure leader swivel is threaded through the y-shaped tube so that the leader end extends out and away from the abbreviated arm and the connector end is positioned within the y-shaped tube. A weight-connecting means can be positioned within the elongated arm, the weight-connecting means adapted to connect a weight to the fishing tackle. Preferably, a connector for connecting the leader swivel, the line swivel and the weight-connecting means is positioned within the y-shaped tube.

The terminal tackle tube can be made from a polymer. In one preferred embodiment, the y-shaped terminal tackle tube comprises a poylvinylchloride. The y-shaped tube can be manufactured by the process of dip molding.

In one preferred embodiment, the lure leader swivel can be a snap swivel. Preferably, the terminal tackle connector can be a first snap and the weight connecting means to the terminal tackle can be a second snap.

The terminal tackle for minimizing the twisting of lines and weights can also be comprise, 1) a y-shaped polyvinylchloride tube having a straight top arm, 2) a curved abbreviated arm, 3) one line snap swivel positioned within the top arm, the line snap swivel adapted to connect the terminal tackle to the fishing line, 4) a lure leader swivel having a leader end for connecting with a leader line, and a connector end, the lure leader swivel threaded through the y-shaped tube so that the leader end extends out and away from the abbreviated arm and the connector end is positioned with the y-shaped tube. A weight connector snap, is preferably positioned within the elongated arm and a connector snap, for connecting the lure leader swivel, the line swivel and the weight-connector snap, is preferably positioned within the y-shaped tube.

One preferred method of manufacturing this invention by dip molding comprises: (1) forming a mold in the shape of the desired tube product terminal tackle product, (2) covering the mold with a liquid polymer, (3) allowing the liquid polymer covering to cure, (4) removing the mold, (5) connecting a line swivel, a lure leader line swivel and a weight connecting means to a connector, (6) inserting the lure leader swivel into the tube so that the lure leader end extends out and away from the abbreviated arm and the connector end is positioned within the tube terminal tackle, (7) inserting the weight-connecting means in the tube so that the weight connector means and the connector is positioned within the elongated arm and the line swivel is positioned within the top arm of the tube, (8) adjusting the line swivel so that it is positioned within the top arm, the line swivel adapted to connect to a fishing line.

BRIEF DESCRIPTION OF THE DRAWINGS

The FIG. 1 depicts a three-dimensional view of one embodiment of the present invention.

FIG. 2 illustrates one embodiment of the present invention.

FIG. 3 is a side view of the terminal tackle of FIG. 1.

FIG. 4 is a cross-sectional view of one preferred embodiment of the present invention.

FIG. 5 depicts an embodiment of the invention having four arms.

FIG. 6 depicts an embodiment of the invention comprising an opening defined in the terminal tackle.

It is to be noted that the drawings illustrates only some typical embodiments of the invention and are therefore not to be considered limiting of its scope, for the invention will admit to other equally effective embodiments.

DETAILED DESCRIPTION OF THE INVENTION

The present invention comprises terminal tackle for minimizing the twisting of lines, lures and weights. Fishing tackle often comprises a primary fishing line connected to a rod and reel and other, shorter lines for connecting lures or weights to the primary fishing line. Leader lines are used to connect the lures to the primary fishing line. The leader line and lure or bait typically float and are subject to the currents and movements of the water thereby simulating natural bait for fish. Weight lines connected to the primary fishing line are used to attach weight to control the depth at which the lure floats. While fishing, these shorter lines, lures and weights can become twisted and tangled with each other or the primary fishing line.

The present invention comprises a terminal tackle 10 to minimize the twisting of lines. The preferred terminal tackle 10 comprises a tube 20 enclosing the connection of the primary fishing line 55, lure leader line 65, and/or weight line 75. It is recognized in the art of fishing that multiple lines for lures may be utilized. Referring to FIG. 2, the tube 20 can house the connection point 41 of the multiple lines, weights and primary fishing line. Preferably, the individual lines are separated for a short distance by the arms 22, 26, 28 of a y-shaped tube 20 from the connecting point 41 as illustrated in FIG. 2.

Referring to FIG. 1 and 2, the terminal tackle comprises a y-shaped tube 20 comprising of a straight top arm 22, one curved, elongated arm 26, and one curved, abbreviated arm 28. As illustrated by FIG. 4, the y-shaped tube 20 houses one or more connectors 40. The connector 40 allows one or more weight lines 65 and one or more lure leader lines 75 to be connected to the primary fishing line 55. Preferably, a weight (not shown) is connected to the weight line 65, a line swivel 50 is connected to the primary fishing line 55, and a lure leader swivel 70 is connected to a lure leader 75. In one preferred embodiment, a connector 40, positioned within the y-shaped tube 20, connects the lure leader swivel 70 and the weight-connecting means 60 to the line swivel 50. In this way, the weight (not shown) by attachment the weight line 65 and the lure (not shown) by attached to the lure leader line 75 are ultimately connected to the primary fishing line 55 by means of the line swivel 50. The lines are connected yet separate from each other by a sufficient distance to minimize twisting and tangling. In one embodiment, the length of the y-shaped tube 20 from the top 22a of the straight top arm 22, to the bottom 26a of the curved, elongated arm 26, can be within a range of from about 1 inch to about 5 inches. Preferably the length from the top 22a of the straight top arm 22, to the bottom 26a of the curved, elongated arm 26, is within a range of from about 1 ⅛ inch to about 3 inches. It is within the scope of this invention that the length of the y-shaped tube 20 can be greater or smaller for use with fishing tackle employed to catch smaller or larger fish. The distance of the curved, abbreviated arm 28 to the top of the straight arm 22a can very from within a range of about ½ inch to about 3 inches. Preferably the distance of the curved abbreviated arm 28 to the top of the straight arm 22a is about 1 inch. Greater distances can be used for larger tackle 10.

In one preferred embodiment, as illustrated in FIG. 4, terminal tackle for minimizing the twisting or tangling of fishing lines comprises a y-shaped tube 20 having a top arm 22, one elongated arm 26 and one abbreviated arm 28. Preferably, a line swivel 50 is positioned within the top arm 22. The line swivel 50 is adapted to connect fishing tackle (not shown) such as weights or lures to the primary fishing line 55. Preferably, a lure leader swivel 70 having a leader end 73 and a connector end 74 is threaded through the y-shaped tube 20 so that the leader end 74 extends out and away from the abbreviated arm 28 and the connector end 73 is positioned within the y-shaped tube 20. The leader end 74 is adapted to connect with a lure leader line 75, which in turn is connected to lures (not shown).

In one preferred embodiment the leader swivel 70 is a snap swivel. In another preferred embodiment the line swivel is a snap swivel, the connector 40 is a first snap connector and the weight-connecting means 60 is a second snap connector.

Preferably, the terminal tackle is assembled by attaching the weight line 65 to a snap 60. The snap is attached to a connector 40. The connector 40 can be a snap connector 40. Snap connectors 40 open easily to allow connecting of tackle lines. A weight connector 60 is also attached to the connector 40 so that a weight (not shown) can be added to the tackle lines. A line swivel 50 can then be attached to connector 40. The line swivel 50, weight-connector 60 and connector 40 are then threaded through the y-shaped tube 20. The lure leader swivel 70 is threaded through abbreviated arm 28 until the leader end 74 partially extends through abbreviated arm opening 25. The line swivel 50 and connector 40 are threaded through the top arm 22 and top arm opening 23 so that the end 51 of the line swivel can extend through the fishing line arm opening 23 for attaching to the primary fishing line 55. The terminal tackle is then complete and ready for the attachment of the lure leader line 75 and the primary fishing line 55 or weight line 65.

The terminal tackle of the y-shaped tube 20 can comprise a straight top arm 22, at least one curve elongated arm 26, and one curved abbreviated arm 28. Preferably the lure leader swivel 70 extends out and away from the abbreviated arm 28 and the weight connecting snap 60 is positioned within the elongated arm 26. The line swivel 50 is positioned within the top straight arm 22. A connector or snap 40 positioned within the tube 20 connects the weight snap 60, the lure leader swivel 70 and the line swivel 50 thereby connecting all of the fishing tackle lines to the primary line 55.

In another preferred embodiment as shown in FIG. 5, the tube 20 can comprise multiple tubular arms to allow additional weights or lure leader lines 75 to be attached to the primary fishing line 55. FIG. 5 illustrates one embodiment terminal tackle having four arms 22, 24, 26, 28 to accommodate a primary line 55 connected to three tackle lines 55, 65, 75. The length of the tube arms may be varied as desired to facilitate the minimization of tangles of the various lines and to accommodate larger tackle for use in catching larger sized fish.

In another preferred embodiment of the invention as illustrated in FIG. 6, an access opening 90 is constructed on the side of the tube 20. This access opening facilitates the connection of the multiple lines. Specifically, it can allow additional lines to be threaded through the opening 90 to allow the multiple lines to be tied together 41 as illustrated in FIG. 2. The access opening 90 can also be used to connect the multiple connectors 40, 60, and line swivels, 70, at the juncture of the tube arms. FIG. 2 illustrates one embodiment of this invention comprising a primary fishing line 55 attached to other tackle lines 65, 75 at a point of connection 41. The lines 55, 65, 75 can be tied or knotted together prior to inserting in the y-shaped tube 20.

Preferably the y-shaped tube is manufactured from a polymer. More preferably the polymer is a polyvinylchloride. The thickness of the wall of the y-shaped tube 20 can vary within in a range of from about $40,000^{th}$ of an inch to about $80,000^{th}$ of an inch. A preferred wall thickness is $60,000^{th}$ of an inch with a deviation of +/−20,000. The diameter of the opening defined by the the y-shaped tube 20 can vary from about 0.1 inch to about 0.4 inch. Variations of these dimensions are within the scope of this invention for larger y-shaped tubes.

In one preferred embodiment of the invention, the tube 20 is made from a pliable polymer or polyvinylchloride material such as Plastisol™. In one preferred method of manufacturing the y-shaped tube 20, the y-shaped tube is manufactured by the process of dip molding. A mold configured to the desired size and shape of arms and openings is formed. The mole is dipped into the liquid polymer or Plastisol™. The Plastisol™ is then cured and the mold removed. The arms 22, 26, and 28 can be trimmed to desired lengths. Preferably, the y-shaped tube is trimmed to comprise one elongated arm 26 one straight top arm 22 one of abbreviated arm 28. The lines, swivels and connectors are then inserted into the tube to complete the assembly of the terminal tackle. Preferably, the method further comprises connecting a line swivel, a leader swivel and a weight connecting means to a connector; inserting that leader swivel into the y-shaped tube so that one end of the leader swivel extends out and away from the abbreviated arm and the connector end is positioned within the y-shaped tube. The method further comprises: inserting the weight-connecting means into the y-shaped tube so that the weight-connecting means is positioned within the elongated arm and positioning the line swivel within the top arm of the tube so that one end of the line swivel extends from the top arm, the line swivel being adapted to connect to a fishing line.

Alternatively, the tube 20 can also be manufactured from rigid or non-pliable material. This may be of particular usefulness if long lure leader lines 20 are to be used and it is the goal to maintain greater distances between the lure leader lines and thereby the separate lures. Use of rigid or non-pliable material may be beneficial with long tube arms 22, 26.

Terminal tackle 10 can be made from a translucent material. If constructed from a pliable material, the pliability of the material can also facilitate the connection of the tackle lines. The terminal tackle can also be manufactured in different colors that are known to attract fish. Colored y-shaped tubes 20 may be interchanged during the course of the day to maximize the efficiency of the invention 10 to attract fish.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A terminal fishing tackle for minimizing the twisting of lines and weights, the fishing tackle comprising:
   a y-shaped tube having a top arm, one elongated arm and one abbreviated arm;
   a line swivel positioned within the top arm, the line swivel adapted to connect the fishing tackle to a primary fishing line;
   a lure leader swivel having a leader end adapted to connection with a leader line, and a connector end, the leader swivel threaded through the y-shaped tube so that the leader end extends out and away from the abbreviated arm and the connector end is positioned within the y-shaped tube;
   a weight-connecting means positioned within the elongated arm, the weight-connecting means adapted to connect a weight to the fishing tackle;
   and a connector for connecting the leader swivel, the line swivel and the weight-connecting means, the connector positioned within the y-shaped tube.

2. The terminal tackle of claim 1 wherein the y-shaped tube is manufactured from a polymer.

3. The terminal tackle of claim 1 wherein the y-shaped tube is manufactured from polyvinylchloride.

4. The terminal tackle of claim 1 wherein the y-shaped tube is manufactured by the process of dip molding.

5. The terminal tackle of claim 1 wherein the leader swivel is connected to a leader line that has been threaded through the y-shaped tube.

6. The terminal tackle of claim 1 wherein the line swivel is a snap swivel.

7. The terminal tackle of claim 1 wherein the connector is a first snap.

8. The terminal tackle of claim 1 wherein the weight connecting means is a second snap.

9. Terminal tackle for minimizing the twisting of lines and weights, the terminal tackle comprising:
   a y-shaped tube having a straight top arm, one curved, elongated arm, and one curved, abbreviated arm;
   a line swivel positioned within the top arm, the line swivel adapted to connect the fishing tackle to a fishing line;
   a leader swivel having a leader end adapted to connecting with a leader line, and a connector end, the leader swivel threaded through the y-shaped tube so that the leader end extends out and away from the abbreviated arm and the connector end is positioned within the y-shaped tube;
   a weight-connector positioned within the elongated arm; and
   a connector for connecting the leader swivel, the line swivel and the weight-connector, the connector positioned within the y-shaped tube.

10. Terminal tackle for minimizing the twisting of lines and weights, the terminal tackle comprising:
   a y-shaped, polyvinylchloride tube having a straight top arm, one curved, elongated arm, and one curved, abbreviated arm;
   a line snap swivel positioned within the top arm, the line snap swivel adapted to connect the fishing tackle to a fishing line;
   a leader swivel having a leader end for connecting with a leader line, and a connector end, the leader swivel threaded through the y-shaped tube so that the leader end extends out and away from the abbreviated arm and the connector end is positioned within the y-shaped tube;

a weight-connector snap positioned within the elongated arm; and a connector snap for connecting the leader swivel, the line swivel and the weight-connector snap, the connector snap positioned within the y-shaped tube.

11. A method of manufacturing terminal tackle comprising:
 a. forming a mold in the shape of a y-shaped tube comprising a top arm, an elongated arm, and an abbreviated arm;
 b. dipping the mold into a liquid polymer;
 c. curing the liquid polymer covering the mold;
 d. removing the mold;
 e. connecting a line swivel, a leader swivel and a weight connecting means to a connector;
 f. inserting that leader swivel of step (e) into the y-shaped tube so that one end of the leader swivel extends out and away from the abbreviated arm and the connector end is positioned within the y-shaped tube;
 g. inserting the weight-connecting means of step (e) into the y-shaped tube so that the weight-connecting means is positioned within the elongated arm; and
 h. positioning the line swivel within the top arm of the tube so that one end of the line swivel extends from the top arm, the line swivel adapted to connect to a fishing line.

12. The method of claim 11 wherein the liquid polymer is polyvinylchloride.

* * * * *

UNITED STATES PATENT AND TRADEMARK OFFICE
CERTIFICATE OF CORRECTION

PATENT NO. : 6,176,036 B1
DATED : January 23, 2001
INVENTOR(S) : Philip J. Pease It is certified that error appears in the above-identified patent and that said Letters Patent is hereby corrected as shown below:

<u>Title page,</u>
Item [76] the inventor should read "Philip J. Pease."

Signed and Sealed this

Twenty-fifth Day of September, 2001

Attest:

*Attesting Officer*

NICHOLAS P. GODICI
*Acting Director of the United States Patent and Trademark Office*